(12) United States Patent
Nowicki et al.

(10) Patent No.: US 12,078,584 B2
(45) Date of Patent: Sep. 3, 2024

(54) DEVICE FOR MEASURING THREE-DIMENSIONAL VELOCITY, SIZE, AND/OR SHAPE OF PARTICLES

(71) Applicant: Southwest Research Institute, San Antonio, TX (US)

(72) Inventors: Keith Nowicki, Hot Springs Village, AR (US); Alex Parker, Bellingham, WA (US); Alejandro Soto, Boulder, CO (US)

(73) Assignee: Southwest Research Institute, San Antonio, TX (US)

( * ) Notice: Subject to any disclaimer, the term of this patent is extended or adjusted under 35 U.S.C. 154(b) by 460 days.

(21) Appl. No.: 17/547,308

(22) Filed: Dec. 10, 2021

(65) Prior Publication Data

US 2022/0196537 A1    Jun. 23, 2022

Related U.S. Application Data

(60) Provisional application No. 63/128,231, filed on Dec. 21, 2020.

(51) Int. Cl.
*G01N 15/10*      (2024.01)

(52) U.S. Cl.
CPC ..... *G01N 15/10* (2013.01); *G01N 2015/1027* (2024.01); *G01N 2015/1029* (2024.01); *G01N 2015/103* (2024.01)

(58) Field of Classification Search
CPC ............. G01N 15/10; G01N 2015/103; G01N 2015/1029; G01N 2015/1027
See application file for complete search history.

(56) References Cited

PUBLICATIONS

Damaschke, N., Nobach, H., Nonn, T.I., Semidetnov, N. and Tropea, C., 2005. Multi-dimensional particle sizing techniques. Experiments in fluids, 39, pp. 336-350.*

* cited by examiner

*Primary Examiner* — Rebecca C Bryant
(74) *Attorney, Agent, or Firm* — Livingston Law Firm (57) ABSTRACT

A velocimeter/nephelometer for measuring the three-dimensional velocity and/or size and/or shape of a particle. A set of laser interferometers and a set of photodiode detectors are arranged on a two-dimensional platform. Each laser interferometer produces a laser beam, with the beams intersecting within an inner area of the platform. Two of the laser interferometers produce like-oriented fringe patterns with an angular separation between the propagation direction of their beams of ninety degrees. A third of the laser interferometers produces a beam with the fringe pattern oriented orthogonal to the fringe patterns of the other two laser interferometers. Each detector is positioned and filtered to detect light from an associated laser interferometer, the light having been scattered by a particle as the particle passes through a volume of observation.

15 Claims, 6 Drawing Sheets

DEVICE FOR MEASURING THREE-DIMENSIONAL VELOCITY, SIZE, AND/OR SHAPE OF PARTICLES

CLAIM TO PRIORITY DATE

This patent application claims the priority filing date of U.S. Provisional Patent App. No. 63/128,231 filed Dec. 21, 2020, entitled "Device for Measuring Velocity, Size, and Shape of Particles in Free Space".

TECHNICAL FIELD OF THE INVENTION

This invention relates to a device for measuring the velocity, size, and/or shape of particles.

BACKGROUND OF THE INVENTION

For measuring particle velocity, laser Doppler velocimeters use a simple principle. A standing or traveling wave interference fringe pattern is generated that extends through some measurement volume. The interference pattern is projected onto the particle. Then, the frequency of the light fluctuations as the particle passes through the fringes is measured.

For measuring particle size and shape, the scattering of light by particles suspended in a transparent medium has long been of interest and is sometimes referred to as "Mie scattering". Early particle shape detection was limited to the analytically tractable problem of plane waves interacting with spherical particles. More recent studies have explored other geometries including cylinders, cubes, particles with a higher number of flat surfaces, and eventually particles with greater complexity.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a compact, low-mass, diode-laser-based particle velocimeter (for measuring three-dimensional particle speed) and nephelometer (for measuring particle size and shape).

This laser velocimeter/nephelometer (referred to herein as the LVN) enables the use of both laser velocimetry to detect particle velocity and as well as laser scattering to measure particle size and shape. The LVN is particularly suitable for measuring particle velocity and/or size and/or shape in free space.

Particle Characteristics Whose Detection is Enabled by the LVN

As stated in the Background, as particles pass through a spatially periodic intensity pattern of a laser beam, they scatter light. The LVN detects this scattered light and uses it to measure velocity in three dimensions.

Figure 1:
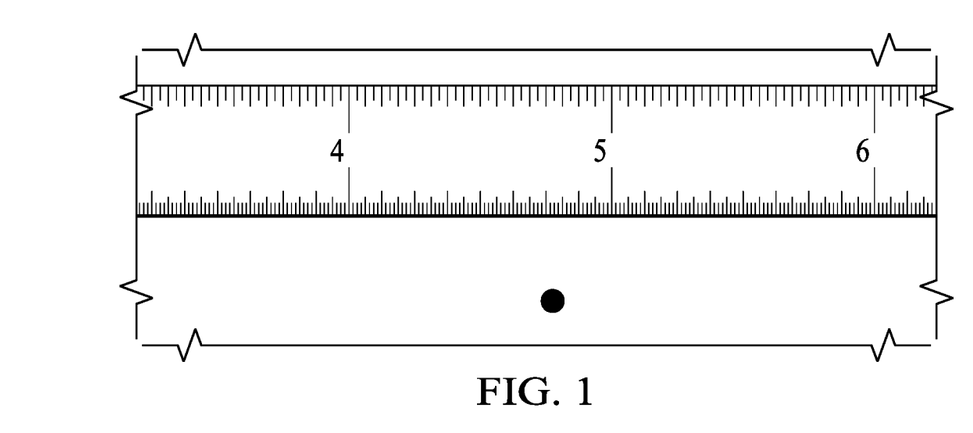
FIG. 1 illustrates forward light scattering (Mie scattering) by a spherical particle.
Figure 2:
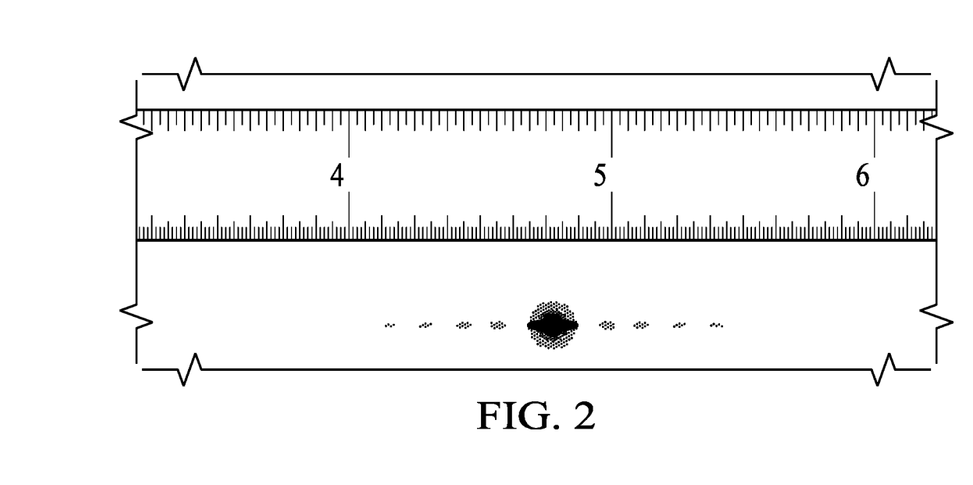
FIG. 2 illustrates forward light scattering (Mie scattering) by a cylindrical particle.

For measuring particle size and shape, the LVN detects Mie scattering, and provides data that may then be processed. FIGS. 1 and 2 illustrate forward light scattering (Mie scattering) by differently shaped particles. As illustrated in FIG. 1, in the case of spheres, light will be diffracted with radial symmetry around the particle. As illustrated in FIG. 2, for cylinders, light will be diffracted to either side.

For non-symmetric particles, the amount of light scattered in a plane is, to first order, determined by the dimension of the particle in that plane. But as the number of surfaces increases and as they vary from isomorphic geometries, it becomes more difficult to calculate the distribution of the diffracted light requiring numerical simulations.

By keeping all other conditions equal, the diffraction of light by a particle is dependent upon the ratio of the size of the particle with respect to the wavelength of the light being used. Scaling both of these lengths equally yields an identical scattering phase function.

Another feature of light scattered by a particle is that in the regime where the dimension of the particle is approximately the same as the wavelength of light, the intensity of the diffracted light is greatest in the forward direction. In FIG. 2, a hair 80 µm wide is suspended in a 5 mW and 532 nm laser beam used to measure the forward scattered intensity.

Numerical computations play an important role in measuring the forward scattering of light by particles. Various algorithms can be used to calculate Mie scattering by various particle geometries and sizes, although existing algorithms tend to be restricted to spheres and cylinders. These algorithms allow the user to select the relative scale of the particle, index of refraction of the particle, absorption and some measure of sub-wavelength roughness. The output of these simulations typically are plots of the scattered intensity as a function of angle from the incident angle. A 0-degree angle is considered the forward direction and a 180-degree angle is perfectly backscattered.

In all cases where the particle is approximately the size of the illumination wavelength, the light is preferentially scattered in the forward direction and quickly decreases as the angle approaches approximately 15 degrees. The forward scattered intensity per unit angle can be up to three orders of magnitude greater than backscattered light. The intensity is also dependent upon the polarization of the light, with s-polarized light (E-field perpendicular to surface) generally having a greater number and deeper local minima than p-polarized light (E-field parallel to surface).

As explained below, the LVN uses the much higher intensity of forward-scattered light to reduce the required collection cross-section of the detector.

Laser Velocimeter/Nephelometer

Figure 3:
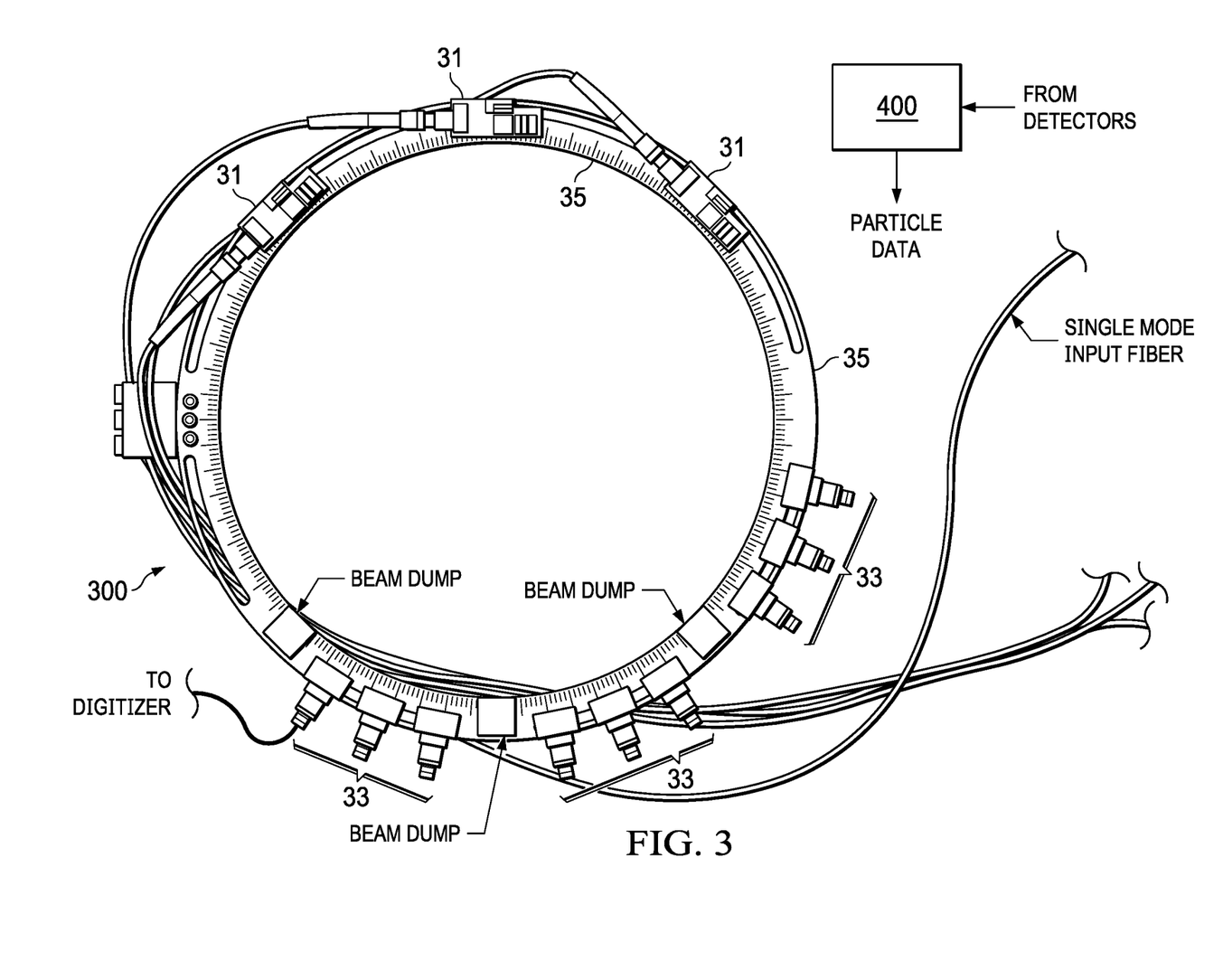
FIG. 3 illustrates a laser velocimeter/nephelometer (LVN) in accordance with the invention.
Figure 4:
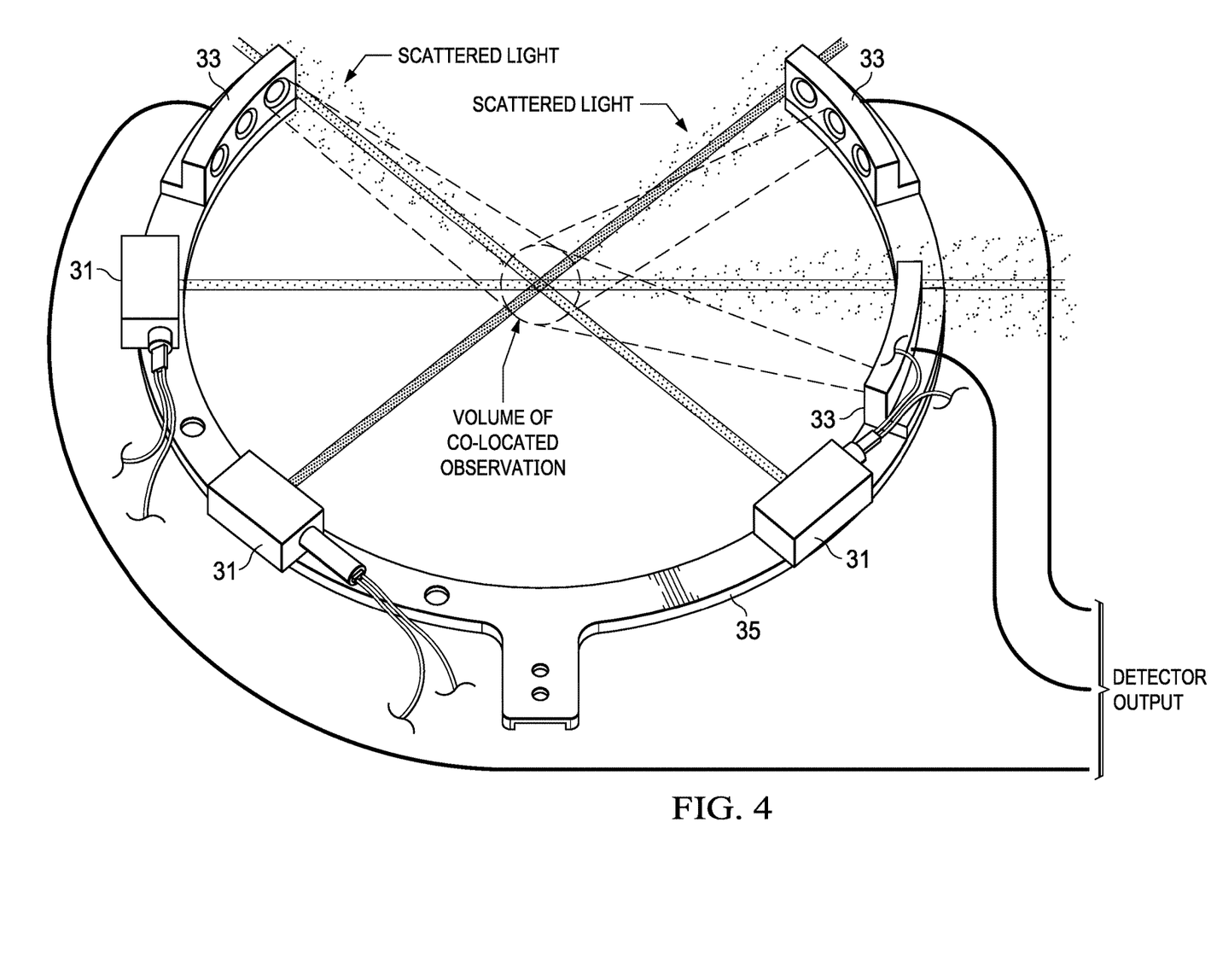
FIG. 4 also illustrates the LVN and further illustrates the generation of laser beams and detection of scattered light within the LVN.

FIG. 3 illustrates a laser velocimeter/nephelometer (LVN) 300 in accordance with the invention. FIG. 4 also illustrates LVN 300 and further illustrates the generation of laser beams and detection of scattered light within the LVN 300.

LVN 300 has three laser diode interferometers 31. As explained below, a laser diode generates a laser beam, and an interferometer generates fringes in the beams.

LVN 300 further has at least three detector arrays 33. Each detector array 33 is a color-filtered photodiode array. Each detector array 33 is associated with one of the laser interferometers 31 and is filtered to detect the light from that laser interferometer 31. In the example of this description, three detector arrays 33 are described, but LVN could have any number of additional detector arrays.

The laser interferometers 31 and detectors 33 are mounted on and arranged around a two-dimensional platform 35. The platform is "two-dimensional" in the sense that the laser interferometers 31 and detectors 33 are mounted in the same plane.

In the example of this description, platform 35 is ring-shaped, but other configurations could be used. As explained below, three-dimensional measurements are enabled by orthogonal fringe patterns, which allows the platform carrying the laser interferometers 31 and associated detectors 33 to be two-dimensional. Another example of a suitable platforms 35 is rectangular structure. The platform 35 need not have a closed geometry.

The laser beams generated by laser interferometers 31 intersect within the inner area formed by ring 35. This results in a volume of co-located observation, referred to herein as a measurement volume. This measurement volume may be as small as one cubic centimeter or less. In the example of FIGS. 3 and 4, the measurement volume is in the center of the ring.

When particles passing through the measurement volume scatter light, a portion of this light is collected by a detector 33. The detection produces an electrical signal from which the particle velocity component perpendicular to the plane of the beams can be determined.

As explained below, LVN 300 measures three-dimensional velocities of particles with this compact two-dimensional structure. Also, data from multiple detectors 33 is used to determine particle size and shape.

A feature of LVN 300 is that it may use the entire beam length to acquire velocity data. Three-dimensional velocity vectors are measured in an intersection volume of the beams, while one-dimensional velocities can be determined anywhere within any single beam.

Particle size and shape are obtained by spatially sampling the forward-scattered light field at a few locations. The Fourier relationship between the light fields and particle size at the same angle is exploited.

More specifically, LVN 300 measures light scattered from particles flowing through collimated laser beams. The laser interferometers 31 encode the beams with linear interference fringes. Each beam is encoded along its entire length between laser interferometer 31 and detector 33.

LVN 300 uses forward scattered light, which as previously discussed, has intensity of up to three orders of magnitude brighter than backscattered intensity. In addition, LVN 300 uses nearly the entire beam between the laser interferometer 31 and its associated detector 33.

Figure 5:
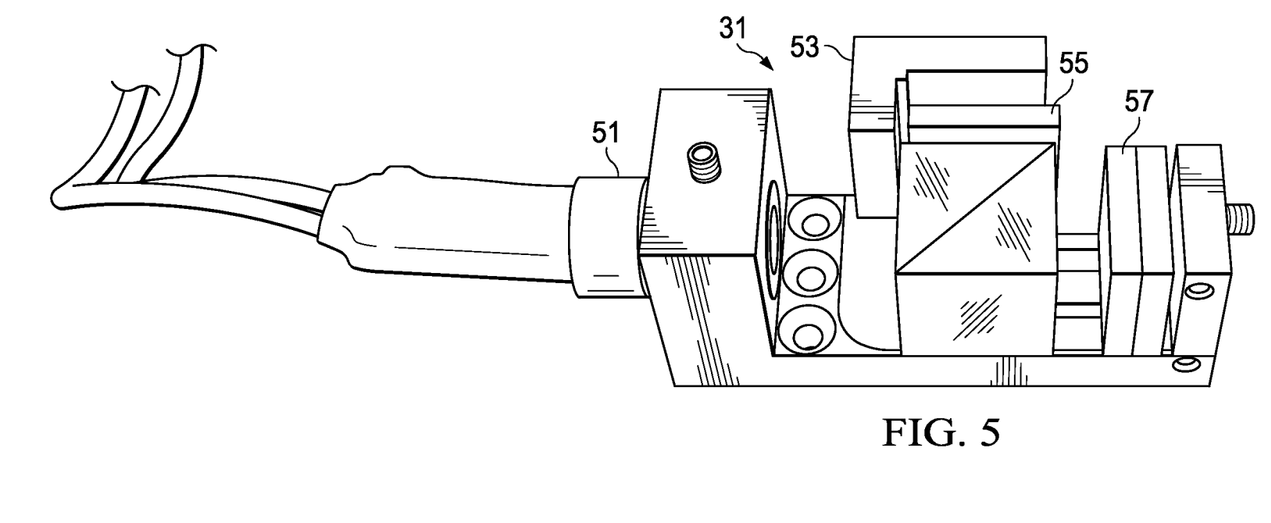
FIG. 5 illustrates one of the laser interferometers in further detail.

FIG. 5 illustrates one of the laser interferometers 31 in further detail. Each laser interferometer 31 may be a simple amplitude-division interferometric cell.

A laser diode 51 generates a laser beam. Laser diodes are manufactured over a range of wavelengths (405 nm-3000 nm) and with a range of powers (0.5 mW-5 W). Laser diodes are small (30 square mm or so) and emit light in a narrow spectral width. They have stable longitudinal modes and have coherence lengths on the order of 3 cm making it easy to produce stable interference fringes.

Each the laser diode 41 in its respective laser interferometer 31 generates a different color to measure the orthogonal components of the particle velocity. In the example of this description, the laser diodes 41 emit blue (405 nm), green (532 nm), and red (670 nm) wavelengths. Using three laser diodes 51 with a unique wavelength for each beam allows LVN 300 to isolate each velocity component measurement with an appropriate narrow-bandpass spectral filter.

Mie theory states that scattered light has a strong dependency upon the size of the particle with respect to the wavelength of light. Changing that ratio will change the shape and intensity of the scattering phase function.

For the same particle passing through different beams, the intensity of light that is measured at a specified angle will change according to a scattering phase function. By using three different wavelengths of light, LVN 300 acquires three unique measurements of the size of the particle.

The laser diode 51 is directed into a 50/50 beam-splitter cube 53 with anti-reflective coatings designed for the wavelength of the laser. Each beam is retro-reflected from a mirror 55 and 57 mounted on a single-axis kinematic mount. One mirror 57 tilts in the vertical direction, and the other mirror 55 tilts in the horizontal direction. This simple kinematic system allows mirrors 55 and 57 to produce two beam "arms" and to be aligned to produce a wide range of linear fringe spacings and orientations in the beam.

As an example, to obtain a fringe spacing of 1 mm with 532 nm laser light, the required angle between the two interfering arms is 0.03 degrees. It is easy to achieve angles of this precision with the kinematic system in laser interferometer 31.

The spacing of the constructed fringes, d, is determined by the following equation:

$$d=\lambda/(2*\sin(\theta/2)),$$

where $\lambda$ is the wavelength of light and $\theta$ is the angle between the two interfering collimated beam arms.

Thus, in each laser interferometer 31, a laser beam encounters a beam splitter, which splits the laser light into two beams that follow separate paths of slightly different lengths. When the two beams are recombined, a fringe pattern is created because the two beams have slightly different phase.

Referring again to FIGS. 3 and 4, three detectors 33 detect the scattered light. Each detector 33 has a field of view that includes portions of all the laser beams. By using multiple bandpasses, detectors 33 continuously measure each velocity component (x, y, and z), eliminating the need to sequentially pulse the laser beams.

More specifically, for velocity, each detector and laser combination provides a measurement for one signal, representing an x, y, or z component. Filters are used to ensure that a detector 33 detects only the scattered light from its associated laser interferometer 31.

One of the consequences of using a beam that is encoded along the entire length between laser interferometer 31 and detector 33 is that particles passing through any part of the beam will scatter light that can be picked up by the associated detector 33. To select a part of the beam to sample requires limiting the field of view accessible by the detector 33. Each detector 33 has a lens and variable iris that act as a mechanically adjustable spatial filter that limits the field of view. Light that is scattered from particles is focused to a point on the surface of the iris. Only particles within the field of view will produce focused spots that overlap with the central aperture of the iris, thereby limiting the spatial range collected by the detector 33. At small distances, the instrument uses a 5 mm focal length lens and miniature iris for particle detector at 10 cm.

Figure 6:
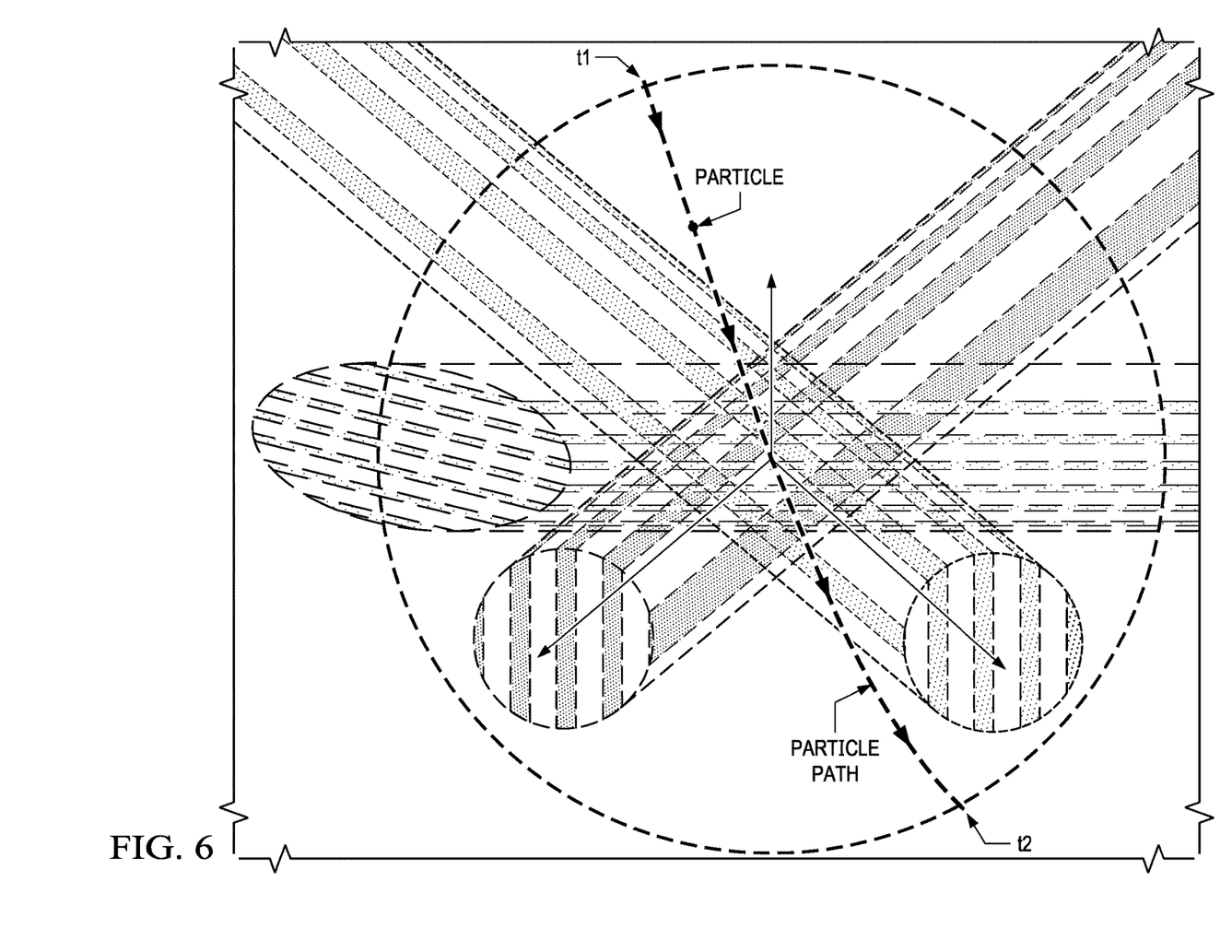
FIG. 6 illustrates the volume of observation of the LVN.

FIG. 6 illustrates the volume of observation of LVN 300. As illustrated above in FIG. 4, this volume is in the center of the velocimeter ring 35. The three beams intersect within this volume. A particle enters this volume at t1, follows a path through the volume, and exits the volume at t2.

Figure 7:
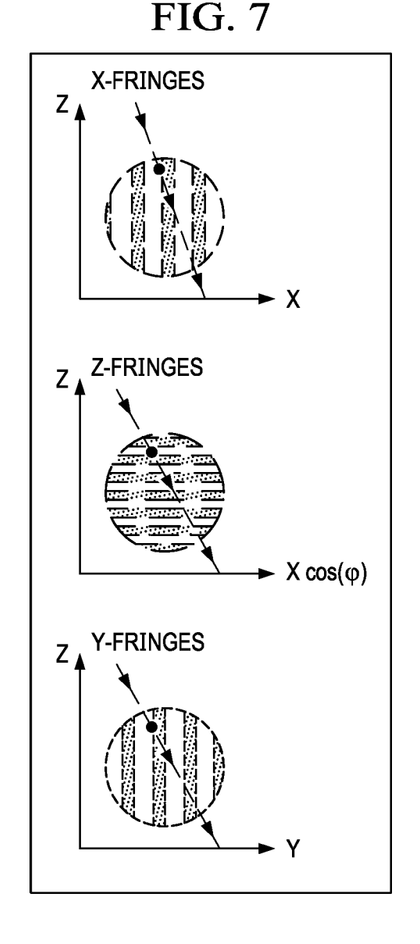
FIG. 7 illustrates the cross-sections of the intersecting beams within the volume of observation.

FIG. 7 illustrates the cross-sections of the intersecting beams within the volume of observation. Referring to both FIGS. 4 and 7, two beams are at 90 degrees separation. The angle of the third beam may vary.

More specifically, two of the laser interferometers 31 produce fringes oriented vertically, with an angular separation between the propagation directions of the two beams of 90 degrees. If the ring 35 sits in the X-Y plane, then this beam and fringe geometry provides X and Y velocity components of particles passing through their overlapping volume.

The third laser interferometer 31 produces a beam with fringes oriented horizontally. Because the fringes are orthogonal to the fringes in both of the other beams, this beam can be oriented at any angle in the X-Y plane.

Figure 8:
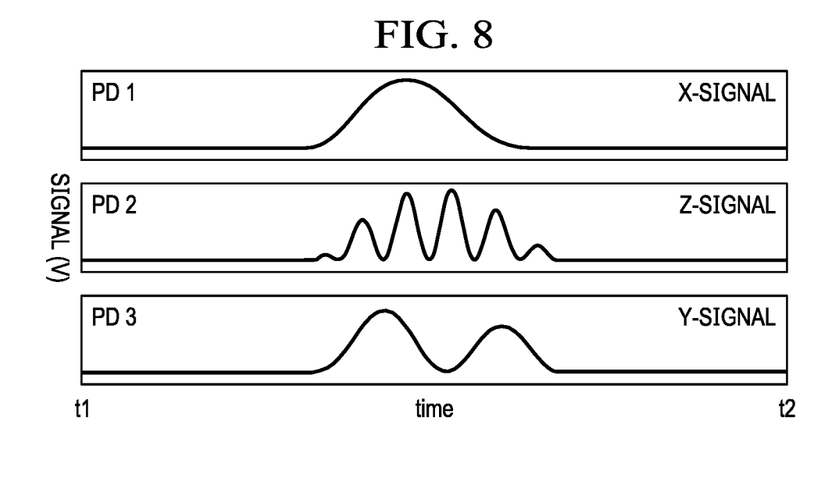
FIG. 8 illustrates the outputs of the three detectors.

FIG. 8 illustrates the outputs of the three detectors 33. With respect to a Cartesian coordinate system, each orthogonal component (Vx, Vy, Vz) of the particle velocity is measured with a single detector 33.

For determining particle size and shape, the three orthogonal detector outputs allow three dimensional measurements. The detector output is read, as with for velocity measurements, but the data is processed differently. Whereas the velocity measurements require determining the fringe spacing in the detected scattered light, for shape measurements, Fourier analysis techniques are applied.

Referring again to FIGS. 3 and 4, a processing unit 400 is programmed to control the laser interferometers 31 and to receive response signals from detectors 33. Processing unit 400 uses the output of detectors 33 to calculate velocity, size, and/or shape of particles passing through the volume of observation. It is assumed that processing unit 400 has appropriate hardware and programming to make these calculations, using the above-described techniques.

What is claimed is:

1. A velocimeter/nephelometer for measuring the three-dimensional velocity and/or size and/or shape of a particle, comprising:
   a two-dimensional platform;
   a set of three laser interferometers mounted to the platform, each operable to produce a laser beam having a fringe pattern;
   wherein the laser interferometers are arranged such that the laser beams intersect within a volume of observation within the inner area of the platform;
   wherein a first two of the laser interferometers are arranged around the platform such that they are spaced ninety degrees apart, and are operable to produce like-oriented fringe patterns with an angular separation between the propagation direction of their beams being ninety degrees;
   wherein a third one of the laser interferometers produces a bean with the fringe pattern oriented orthogonal to the fringe patterns of the first two of the laser interferometers;
   a set of at least three photodiode detectors mounted to the platform; and
   wherein each detector is positioned and filtered to detect light from an associated laser interferometer, the light having been scattered by a particle as the particle passes through the volume of observation.

2. The velocimeter/nephelometer of claim 1, wherein the platform is ring-shaped.

3. The velocimeter/nephelometer of claim 1, further comprising a processing unit for receiving the output of the detectors and for calculating the three-dimensional velocity of a particle from the output of the detectors.

4. The velocimeter/nephelometer of claim 3, wherein the calculating of the three-dimensional velocity is performed using beam fringe spacing techniques.

5. The velocimeter/nephelometer of claim 1, further comprising a processing unit for receiving the output of the detectors and for calculating the three-dimensional shape of a particle from the output of the detectors.

6. The velocimeter/nephelometer of claim 5, wherein the calculating of the three-dimensional shape is performed using Fourier relationship techniques.

7. The velocimeter/nephelometer of claim 1, further comprising a processing unit for receiving the output of the detectors and for calculating the three-dimensional size of a particle from the output of the detectors.

8. The velocimeter/nephelometer of claim 7, wherein the calculating of the three-dimensional shape is performed using Fourier relationship techniques.

9. The velocimeter/nephelometer of claim 1, wherein each detector is an array of three or more detectors.

10. A method of measuring the three-dimensional velocity and/or size and/or shape of a particle, comprising:
    collecting the particle within an observation space of a velocimeter/nephelometer, the velocimeter/nephelometer having: a two-dimensional platform; a set of three laser interferometers mounted to the platform, each operable to produce a laser beam having a fringe pattern; wherein the laser interferometers are arranged such that the laser beams intersect within a volume of observation within the inner area of the platform; wherein a first two of the laser interferometers are arranged around the platform such that they are spaced ninety degrees apart, and are operable to produce like-oriented fringe patterns with an angular separation between the propagation direction of their beams being ninety degrees; wherein a third one of the laser interferometers produces a bean with the fringe pattern oriented orthogonal to the fringe patterns of the first two of the laser interferometers; a set of at least three photodiode detectors mounted to the platform; wherein each detector is positioned and filtered to detect light from an associated laser interferometer, the light having been scattered by a particle as the particle passes through the volume of observation; and
    processing the output of the detectors to produce data representing the three-dimensional velocity, shape, and/or size of the particle.

11. The method of claim 10, wherein the processing step calculates the three-dimensional velocity using beam fringe spacing techniques.

12. The method of claim 10, wherein the processing step calculates the three-dimensional size using Fourier transform techniques.

13. The method of claim 10, wherein the processing step calculates the three-dimensional shape using Fourier transform techniques.

14. The method of claim 10, wherein the platform is ring-shaped.

15. The method of claim 10, wherein each detector is an array of three or more detectors.

* * * * *

UNITED STATES PATENT AND TRADEMARK OFFICE
CERTIFICATE OF CORRECTION

| | | |
|---|---|---|
| PATENT NO. | : 12,078,584 B2 | Page 1 of 1 |
| APPLICATION NO. | : 17/547308 | |
| DATED | : September 3, 2024 | |
| INVENTOR(S) | : Keith Nowicki, Alex Parker and Alejandro Soto | |

It is certified that error appears in the above-identified patent and that said Letters Patent is hereby corrected as shown below:

In the Specification

In Column 1, Line 11, Please insert the following paragraph:
--FEDERALLY SPONSORED RESEARCH AND DEVELOPMENT
This invention was made with government support under NASA Grant and Cooperative Agreement CFDA No. 43.001 awarded by NASA (National Aeronautics and Space Administration. The government has certain rights in the invention.--

Signed and Sealed this
Fourth Day of February, 2025

Coke Morgan Stewart
*Acting Director of the United States Patent and Trademark Office*